US012701575B2

(12) United States Patent (10) Patent No.: US 12,701,575 B2
Cui et al. (45) Date of Patent: Aug. 4, 2026

(54) SECONDARY CELL ACTIVATION

(71) Applicant: Apple Inc., Cupertino, CA (US)

(72) Inventors: Jie Cui, San Jose, CA (US); Dawei Zhang, Saratoga, CA (US); Hong He, San Jose, CA (US); Huaning Niu, San Jose, CA (US); Manasa Raghavan, Sunnyvale, CA (US); Qiming Li, Beijing (CN); Seyed Ali Akbar Fakoorian, San Diego, CA (US); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 738 days.

(21) Appl. No.: 17/917,920

(22) PCT Filed: Oct. 20, 2021

(86) PCT No.: PCT/CN2021/124937
§ 371 (c)(1),
(2) Date: Oct. 7, 2022

(87) PCT Pub. No.: WO2023/065142
PCT Pub. Date: Apr. 27, 2023

(65) Prior Publication Data
US 2024/0251412 A1 Jul. 25, 2024

(51) Int. Cl.
*H04W 72/21* (2023.01)
*H04W 56/00* (2009.01)
(Continued)

(52) U.S. Cl.
CPC ....... *H04W 72/21* (2023.01); *H04W 56/0045* (2013.01); *H04W 72/1268* (2013.01); *H04W 72/51* (2023.01); *H04W 74/0833* (2013.01)

(58) Field of Classification Search
CPC . H04W 72/21; H04W 72/51; H04W 72/1268; H04W 56/0045; H04W 74/0833
(Continued)

(56) References Cited

U.S. PATENT DOCUMENTS

2014/0241149 A1* 8/2014 Liu ........................ H04W 24/02
370/336
2016/0270071 A1* 9/2016 Dinan ................... H04L 1/1854
(Continued)

FOREIGN PATENT DOCUMENTS

EP 3737008 A1 11/2020
WO 2016119202 A1 8/2016

OTHER PUBLICATIONS

International Patent Application No. PCT/CN2021/124937, International Search Report and Written Opinion, Mailed on Jul. 19, 2022, 9 pages.
3rd Generation Partnership Project; Technical Specification Group Radio Access Network; NR; User Equipment (UE) radio access capabilities (Release 16), 3GPP TS 38.306 V16.6.0, Sep. 2021, 155 pages.
(Continued)

*Primary Examiner* — Chi Tang P Cheng
(74) *Attorney, Agent, or Firm* — Kilpatrick Townsend & Stockton LLP

(57) ABSTRACT

Provided is a method performed by a user equipment (UE), comprising: receiving, from a base station (BS), one or more messages comprising: configuration parameters of a plurality of cells, wherein the plurality of cells are to be associated with a plurality of physical uplink control channel (PUCCH) groups comprising: a first PUCCH group comprising an active serving cell, and a secondary PUCCH group comprising a PUCCH secondary cell to be activated; and performing operations during activation of the PUCCH secondary cell based on at least one of a capability of the UE or timing advance group (TAG) configurations in the configuration parameters.

20 Claims, 13 Drawing Sheets

(51) Int. Cl.
  *H04W 72/1268*       (2023.01)
  *H04W 72/51*       (2023.01)
  *H04W 74/0833*       (2024.01)
(58) Field of Classification Search
  USPC ........................................................ 370/329
  See application file for complete search history.

(56) References Cited

U.S. PATENT DOCUMENTS

| | | |
|---|---|---|
| 2016/0366681 A1 | 12/2016 | Dinan |
| 2018/0063832 A1 | 3/2018 | Yamada et al. |
| 2019/0230498 A1* | 7/2019 | Lee ...................... H04L 1/1819 |
| 2020/0036502 A1 | 1/2020 | Kim et al. |
| 2020/0053701 A1 | 2/2020 | Dinan |
| 2020/0296657 A1 | 9/2020 | Dinan |
| 2023/0067430 A1* | 3/2023 | Yuan ................. H04W 74/0841 |

OTHER PUBLICATIONS

WF on further RRM enhancement for NR and MR-DC—PUCCH SCell activation/deactivation requirements, CATT, 3GPP TSG-RAN Meeting #100-e, R4-2115338, Aug. 16-27, 2021, 7 pages.
International Patent Application No. PCT/CN2021/124937, International Preliminary Report on Patentability, May 2, 2024, 5 pages.
Introduce PUCCH on Scell for Ca Beyond 5 Carriers, Huawei, 3Generation Partnership Project Technical Specification Group-Radio Access Network Working Group2 Meeting #89 R2-150372, Athens, Greece, Feb. 9-13, 2015, pp. 1-8.
European Patent Application No. 21960898.1, Extended European Search Report, May 16, 2025, 16 pages.
CL01210-2024, "Office Action", Dec. 16, 2025, 16 pages.
IN202417031229, "First Examination Report", Jun. 1, 2026, 9 pages.
KR10-2024-7012695, "Office Action", Apr. 25, 2026, 17 pages.

* cited by examiner

300

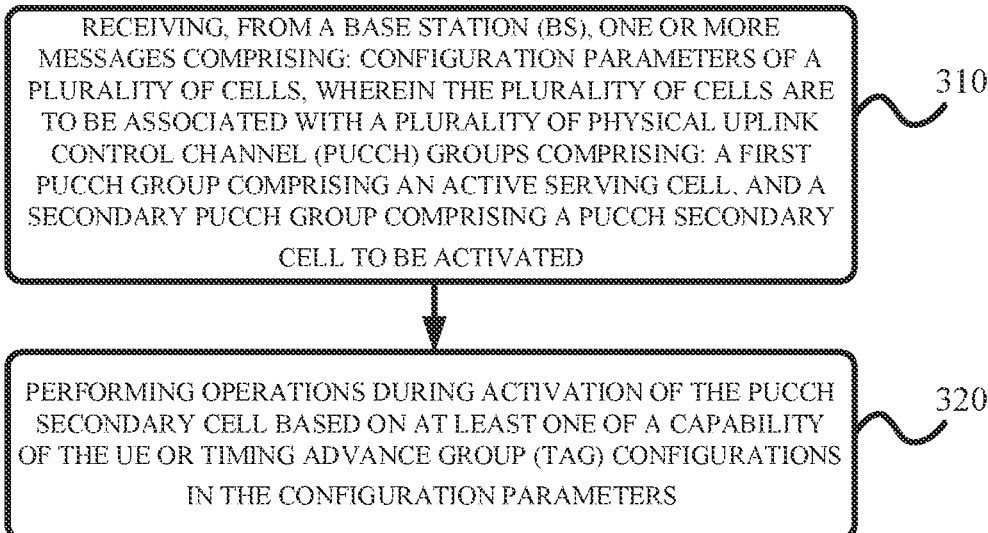

RECEIVING, FROM A BASE STATION (BS), ONE OR MORE
MESSAGES COMPRISING: CONFIGURATION PARAMETERS OF A
PLURALITY OF CELLS, WHEREIN THE PLURALITY OF CELLS ARE
TO BE ASSOCIATED WITH A PLURALITY OF PHYSICAL UPLINK
CONTROL CHANNEL (PUCCH) GROUPS COMPRISING: A FIRST
PUCCH GROUP COMPRISING AN ACTIVE SERVING CELL, AND A
SECONDARY PUCCH GROUP COMPRISING A PUCCH SECONDARY
CELL TO BE ACTIVATED

310

PERFORMING OPERATIONS DURING ACTIVATION OF THE PUCCH
SECONDARY CELL BASED ON AT LEAST ONE OF A CAPABILITY
OF THE UE OR TIMING ADVANCE GROUP (TAG) CONFIGURATIONS
IN THE CONFIGURATION PARAMETERS

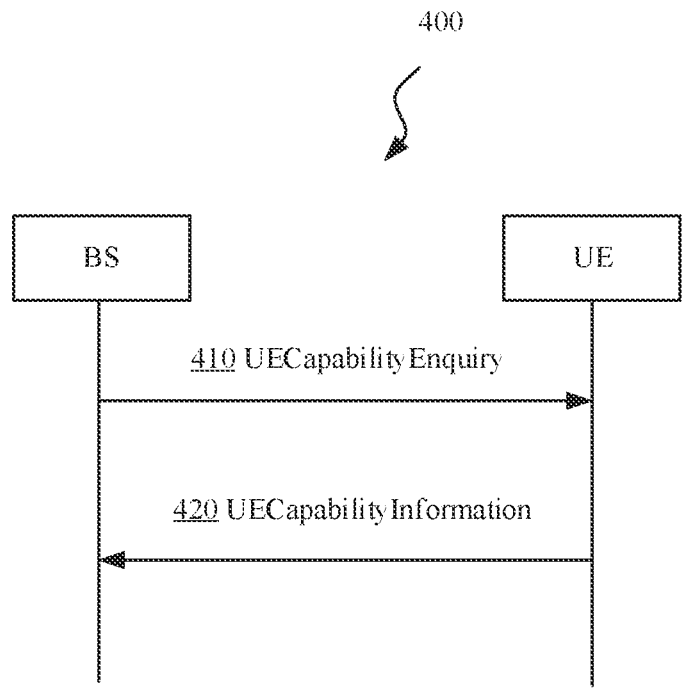

BS

UE

410 UECapability Enquiry

420 UECapability Information

FIG. 4

SECONDARY CELL ACTIVATION

CROSS REFERENCE TO RELATED APPLICATION

This application is a 371 U.S. National Phase of PCT International Patent Application No. PCT/CN2021/124937, filed Oct. 20, 2021, which is herein incorporated by reference in its entirety for all purposes.

TECHNICAL FIELD

This application relates generally to wireless communication systems, and more specifically to secondary cell activation.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method performed by a user equipment (UE) is provided. The method comprises: receiving, from a base station (BS), one or more messages comprising: configuration parameters of a plurality of cells, wherein the plurality of cells are to be associated with a plurality of physical uplink control channel (PUCCH) groups comprising: a first PUCCH group comprising an active serving cell, and a secondary PUCCH group comprising a PUCCH secondary cell to be activated; and performing operations during activation of the PUCCH secondary cell based on at least one of a capability of the UE or timing advance group (TAG) configurations in the configuration parameters.

According to an aspect of the present disclosure, a method performed by a base station (BS) is provided. The method comprises: sending, to a user equipment (UE), one or more messages comprising: configuration parameters of a plurality of cells, wherein the plurality of cells are to be associated with a plurality of physical uplink control channel (PUCCH) groups comprising: a first PUCCH group comprising an active serving cell, and a secondary PUCCH group comprising a PUCCH secondary cell to be activated; and activating the PUCCH secondary cell for the UE, based on at least one of a capability of the UE or timing advance group (TAG) configurations in the configuration parameters.

According to an aspect of the present disclosure, a method performed by a user equipment (UE) is provided. The method comprises: receiving, from a base station (BS), first one or more messages comprising: a request for capability information of the UE, and configuration parameters of a plurality of cells, wherein the plurality of cells are to be associated with a plurality of physical uplink control channel (PUCCH) groups comprising: a first PUCCH group comprising an active serving cell, and a secondary PUCCH group comprising a PUCCH secondary cell to be activated, and transmitting, to the BS second one or more messages indicating the capability information of the UE, wherein the capability information is used for operations performed by the UE during activation of the PUCCH secondary cell.

According to an aspect of the present disclosure, a method performed by a base station (BS) is provided. The method comprises: transmitting, to a user equipment (UE), first one or more messages comprising: a request for capability information of the UE, and configuration parameters of a plurality of cells, wherein the plurality of cells are to be associated with a plurality of physical uplink control channel (PUCCH) groups comprising: a first PUCCH group comprising an active serving cell, and a secondary PUCCH group comprising a PUCCH secondary cell to be activated, and receiving, from the UE, second one or more messages indicating the capability information of the UE, wherein the capability information is used for activating the PUCCH secondary cell for the UE.

According to an aspect of the present disclosure, an apparatus for a user equipment (UE) is provided. The apparatus comprises one or more processors configured to perform steps of the method according to any of methods by the UE provided herein.

According to an aspect of the present disclosure, an apparatus for a base station (BS) is provided. The apparatus comprises one or more processors configured to perform steps of the method according to any of methods by the BS provided herein.

According to an aspect of the present disclosure, a computer readable medium is provided, having computer programs stored thereon which, when executed by one or more processors, cause an apparatus to perform steps of the method according to any of methods provided herein.

According to an aspect of the present disclosure, an apparatus for a communication device is provided. The apparatus comprises means for performing steps of the method according to any of methods provided herein.

According to an aspect of the present disclosure, a computer program product is provided, comprising computer programs which, when executed by one or more processors, cause an apparatus to perform steps of the method according to any of methods provided herein.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 3 illustrates a flowchart for a method performed by a UE in accordance with some embodiments.

FIG. 4 illustrates a transmit scenario with UE capability between a UE and a BS in accordance with some embodiments.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

Figure 1:
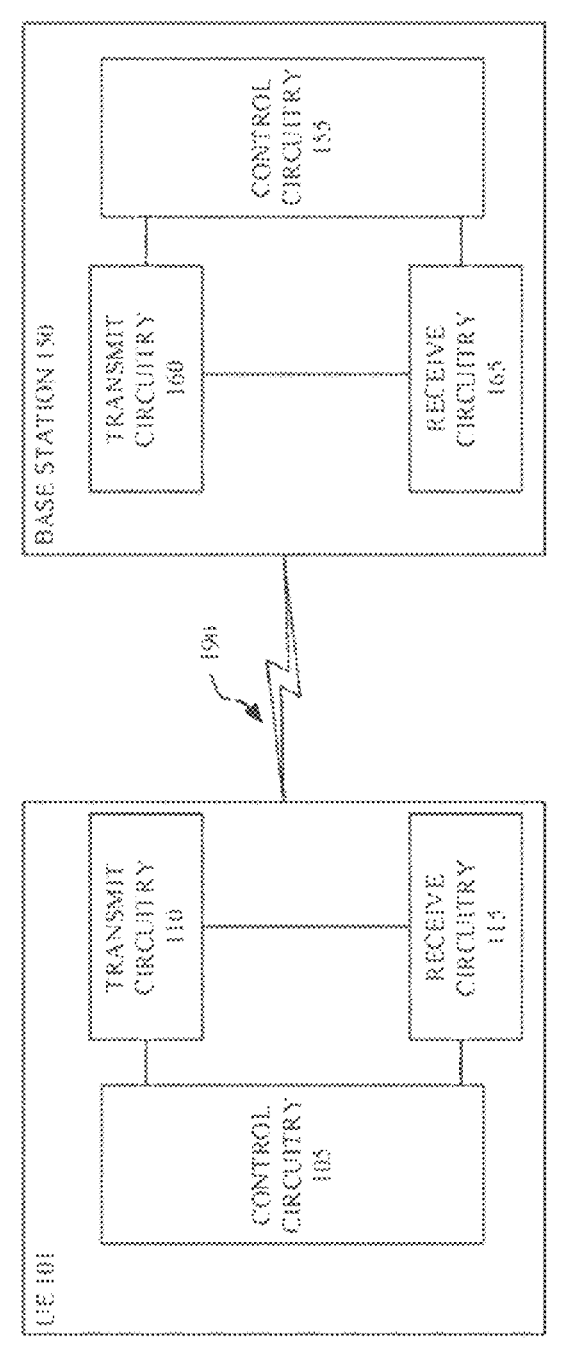
FIG. 1 is a block diagram of a system including a base station (BS) and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 1 10 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 1 10 and the receive circuitry 1 15 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink superframe that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 1 15 may receive multiple copies of the same data multiple times.

Figure 2:
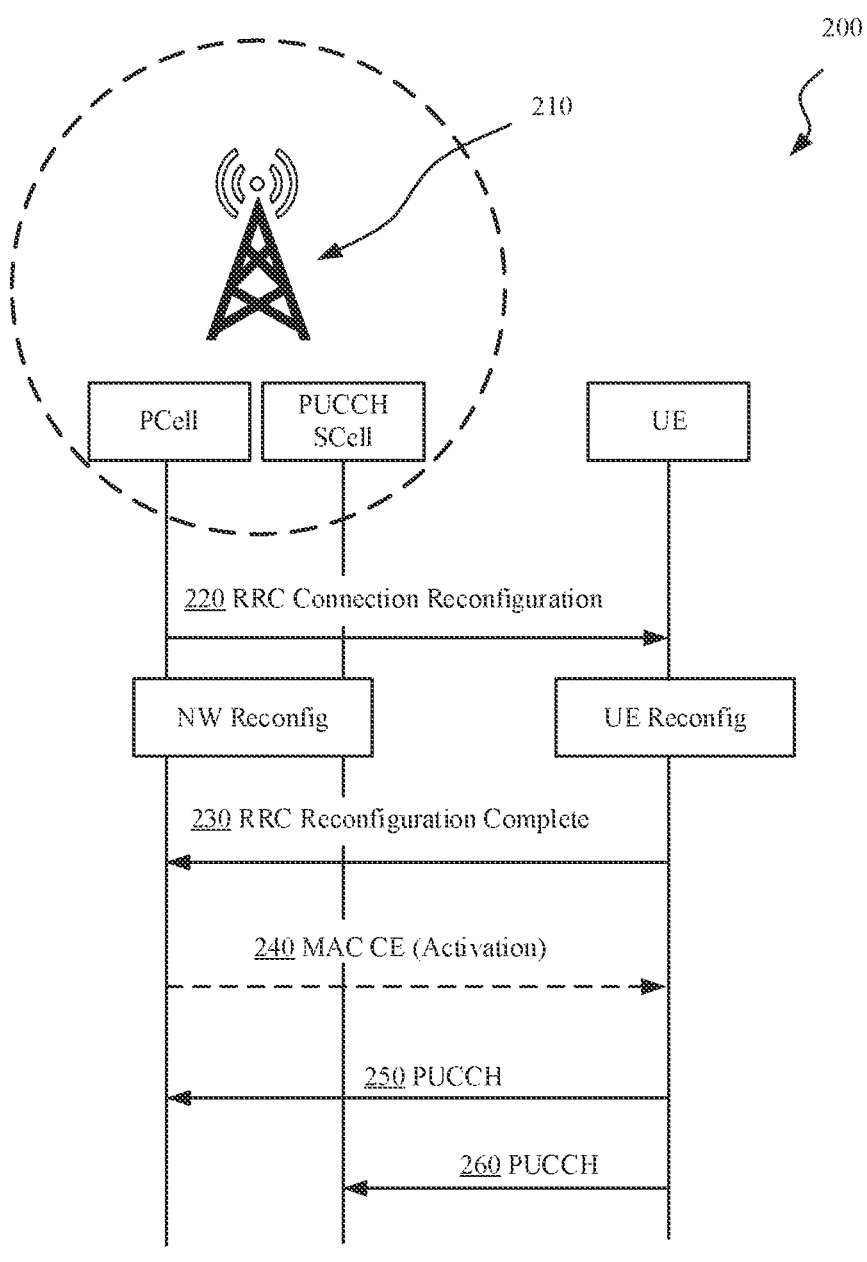
FIG. 2 illustrates an application scenario in accordance with some embodiments.

FIG. 2 illustrates an application scenario 200 in accordance with some embodiments. As depicted in FIG. 2, a base station (BS) 210 comprises a plurality of cells. For example, BS 210 may comprise an active serving cell and a physical uplink control channel (PUCCH) secondary cell (PUCCH SCell). The active serving cell may be a primary cell (PCell). Note that the showing of only two cells in BS 210 is only for brevity. BS 210 may comprise any number of cells. In some examples, PCell and PUCCH SCell may belong to different base stations.

In the scenario 200, a user equipment (UE) may have established the connection with the PCell by sending an RRC Connection Request message to the PCell. The PCell may provide a PUCCH 250 for UE to implement uplink transmission with PCell.

A PUCCH SCell is a secondary cell (SCell) that carries its own uplink channel PUCCH 260, instead of sharing the uplink channel with other cells (e.g., PUCCH 250). In the scenario 200, UE has not yet established the connection with the PUCCH SCell. In order to activate the PUCCH SCell, the PCell may send an RRC Connection Reconfiguration message 220 to UE and UE may respond with an RRC Reconfiguration Complete message 230 to PCell after UE reconfiguration is completed. The PCell may exchange a medium access control control element (MAC CE) 240 with UE to activate the PUCCH SCell. During the activation, UE may communicate with PUCCH SCell. For example, UE may need to perform random access channel (RACH) procedure on PUCCH SCell.

In the scenario 200, due to the PUCCH SCell carries a different PUCCH 260, the potential communication between UE and the PUCCH SCell may collide with the communications between the UE and the active serving cell (e.g., PCell). For example, a RACH occasion from UE to the PUCCH SCell may collide with the transmission between UE and the PCell in time domain or frequency domain. An interruption requirement for PUCCH SCell activation may be needed.

FIG. 3 illustrates a flowchart for a method 300 performed by a UE in accordance with some embodiments. As shown in FIG. 3, method 300 comprises steps 310 to 320.

In step 310, UE receives, from a BS, one or more messages. The one or more messages comprise configuration parameters of a plurality of cells. In some examples, the one or more messages may be the RRC Connection Reconfiguration message 220 as depicted in FIG. 2.

The plurality of cells are to be associated with a plurality of PUCCH groups. A PUCCH group may comprise one or more cells, where all cells in the same PUCCH group share the same PUCCH for uplink transmission. The plurality of PUCCH groups comprises a first PUCCH group comprising an active serving cell, and a secondary PUCCH group comprising a PUCCH secondary cell to be activated. For example, the first PUCCH group may comprise the PCell in FIG. 2, and all cells in the first PUCCH group share the PUCCH 250. Note that a PUCCH group comprising PCell may be called as primary PUCCH group. In some examples, the secondary PUCCH group may comprise the PUCCH SCell in FIG. 2, and all cells in the secondary PUCCH group share the PUCCH 260.

In step 320, UE performs operations during activation of the PUCCH secondary cell (PUCCH SCell) based on at least one of a capability of the UE or timing advance group (TAG) configurations in the configuration parameters. In some examples, UE may perform operations after receiving a command from BS to activate the PUCCH SCell. For example, the command from BS may be MAC CE 240 in FIG. 2. The behavior of UE during the activation of the PUCCH SCell may be different depending on the capability of the UE and/or TAG configurations. In some examples, UE may perform operations for activation based on the capability of the UE. In other examples, UE may perform operations for activation based on TAG configurations in the configuration parameters. In still other examples, UE may perform operations for activation based on both the capability of the UE and the TAG configurations in the configuration parameters.

Thus, by configuring different parameters for the activation of PUCCH SCell, the behavior of UE during the activation can be more flexibly controlled.

FIG. 4 illustrates a transmit scenario 400 with UE capability between a UE and a BS in accordance with some embodiments. As shown in FIG. 4. BS may send a UECapabilityEnquiry message 410 to UE for requesting UE to send capability information. UE may respond by sending a UECapabilityInformation message to BS for reporting to BS the capability information of UE. In some examples, BS may request the capability information when UE has established the connection with a cell in the BS. For example, in FIG. 2, when UE established the connection with the PCell, PCell may request the capability information of UE and UE may respond accordingly. During the activation of the PUCCH SCell (in the same BS 210 with PCell), the capability of UE is already known by the PUCCH SCell and there is no need to repeat the messages 410 and 420.

In some embodiments, the capability of the UE comprises a first capability of whether the UE supports different numerologies between a random access channel (RACH) in the secondary PUCCH group and channels in the first PUCCH group during the activation of the PUCCH secondary cell. In some examples, the capability of the UE may be informed through message 420.

In the current design in 3GPP TS 38.306, an information element (IE) diffNumerologyAcrossPUCCH-Group is defined to indicate whether different numerologies across two new radio (NR) PUCCH groups for data and control channel at a given time in NR carrier aggregation (CA) and (NG)EN-DC/NE-DC are supported by the UE. In some embodiments, the first capability is indicated by an IE, which is an extended version of diffNumerologyAcrossPUCCH-Group as defined in 3GPP TS 38.306. The IE indicates whether the UE supports different numerologies across the first and secondary PUCCH groups for data channel, control channel and RACH at a given time in NR CA and (NG)EN-DC/NE-DC. In some implementations, the definition of the current IE diffNumerologyAcrossPUCCH-Group may be modified to cover RACH as well, besides the current data and control channels.

In some embodiments, the first capability is indicated by an IE other than diffNumerologyAcrossPUCCH-Group as defined in 3GPP TS 38.306. The IE indicates whether the UE supports different numerologies between each of the channels in the first PUCCH group and RACH in the secondary PUCCH group, and the channels comprise data channel, control channel and RACH. For example, a new dedicated signaling or IE diffNumerologyAcrossPUCCH-Group-duringActivtion is created to indicate whether different numerologies between data/control/RACH in the first PUCCH group (e.g., PUCCH group with PUCCH 250 in FIG. 2) and RACH in the secondary PUCCH group (e.g., PUCCH group with PUCCH 260 in FIG. 2) during PUCCH SCell activation in NR CA and (NG)EN-DC/NE-DC are supported by the UE.

In some embodiments, each of the plurality of cells corresponds to a component carrier (CC). In some implementations, when the configuration parameters indicate the active serving cell (e.g., the PCell in FIG. 2) and the secondary cell (e.g., the PUCCH SCell in FIG. 2) are intra-band aggregated, the capability of UE to support different numerologies between data/control/RACH in the first PUCCH group and RACH in the secondary PUCCH group during PUCCH SCell activation may be indicated by the extended IE of diffNumerologyAcrossPUCCH, or by the new dedicated IE of diffNumerologyAcrossPUCCH-Group-duringActivtion.

In some implementations, the configuration parameters indicate the active serving cell and the PUCCH secondary cell are inter-band aggregated, and the capability of the UE comprises that the UE supports different numerologies between each of the channels in the first PUCCH group and RACH in the secondary PUCCH group, the channels comprising data channel, control channel and RACH. For example, when the active serving cell (e.g., the PCell in FIG. 2) and the PUCCH secondary cell (e.g., the PUCCH SCell in FIG. 2) are inter-band aggregated, UE is mandatory to support different numerologies between data/control/RACH in the first PUCCH group and RACH in the secondary PUCCH group during PUCCH SCell activation.

Thus, the capability of UE can be flexibly configured to support the different numerologies, thereby avoiding potential collisions between the uplink transmission in the first PUCCH group and the RACH procedure in the secondary PUCCH group during the activation of PUCCH SCell.

In some implementations, the capability of the UE comprises that the UE does not support different numerologies, and the operations during the activation of the PUCCH secondary cell (step 320) comprise a scheduling restriction for the UE. In some embodiments, when the extended IE of diffNumerologyAcrossPUCCH-Group or the new dedicated IE of diffNumerologyAcrossPUCCH-Group-duringActivtion, indicates that UE does not support the different numerologies during PUCCH SCell activation, a possible interruption requirement or scheduling restriction may be needed.

In some embodiments, when BS has configured different numerologies for the active serving cell and the PUCCH SCell to be activated (but the UE does not support the different numerologies), then the UE is not expected to transmit PUCCH, physical uplink shared channel (PUSCH) or sounding reference signal (SRS) of the active serving cell (belonging to the first PUCCH group) on RACH occasion (RO) symbols of the PUCCH SCell. UE is also not expected to transmit PUCCH, PUSCH or SRS on the symbols that fully or partially overlap with the RO occasion symbols. In some implementation, a scheduling restriction may be prescribed for the UE. UE may stop or interrupt uplink transmissions to the active serving cell in the first PUCCH group on first symbols. The first symbols may be RACH occasions (ROs) symbols for the activation of PUCCH SCell, or may be symbols that fully or partially overlap with the RO symbols.

In some embodiments, a scheduling restriction may be implemented for BS side. For example, when UE does not support the different numerologies. BS may only configure the same numerology between data/control/RACH in the first PUCCH group and RACH in the secondary PUCCH group during PUCCH SCell activation.

Thus, by providing scheduling restriction for UE or BS, a potential collision between the uplink transmission in the first PUCCH group and a RACH procedure in the secondary PUCCH group during the activation of the PUCCH SCell can be avoided.

Additionally or alternatively, the behavior of UE during the activation of PUCCH SCell may depend on the TAG configurations in the configuration parameters. In some embodiments, the plurality of cells are associated with one or more TAGs based on the TAG configurations.

Figure 5A:
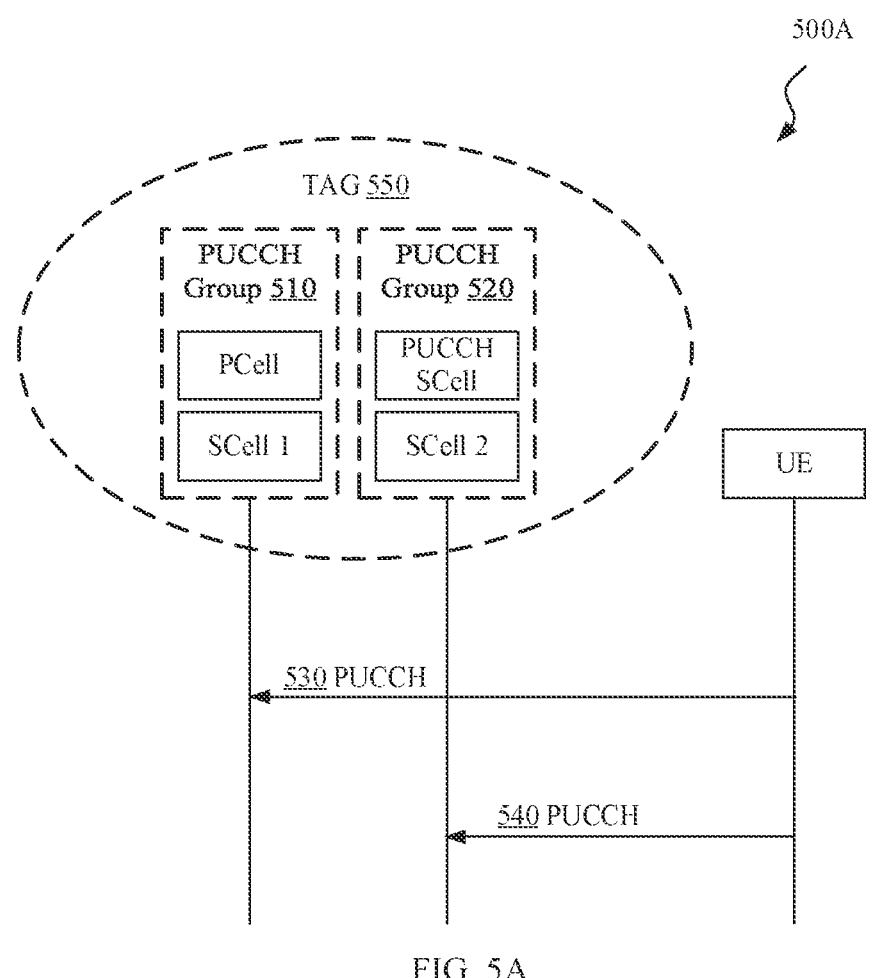
FIG. 5A illustrates a scenario with multiple PUCCH groups in the same TAG in accordance with some embodiments.

In some implementations, each of the plurality of PUCCH groups is associated with one TAG of the one or more TAGs, and the one TAG is associated with at least one of the plurality of PUCCH groups. FIG. 5A illustrates a scenario 500A with multiple PUCCH groups in the same TAG in accordance with some embodiments. As depicted in FIG. 5A, the plurality of cells, e.g., PCell, PUCCH SCell to be activated. SCell 1 and SCell 2, are associated with one TAG 550 in NR-CA or DC. PCell and SCell 1 belong to a primary PUCCH group 510 (or a first PUCCH group) with PUCCH 530 transmitted to the BS (not shown). PUCCH SCell belongs to a secondary PUCCH group 520 with PUCCH 540 transmitted to the BS.

Figure 5B:
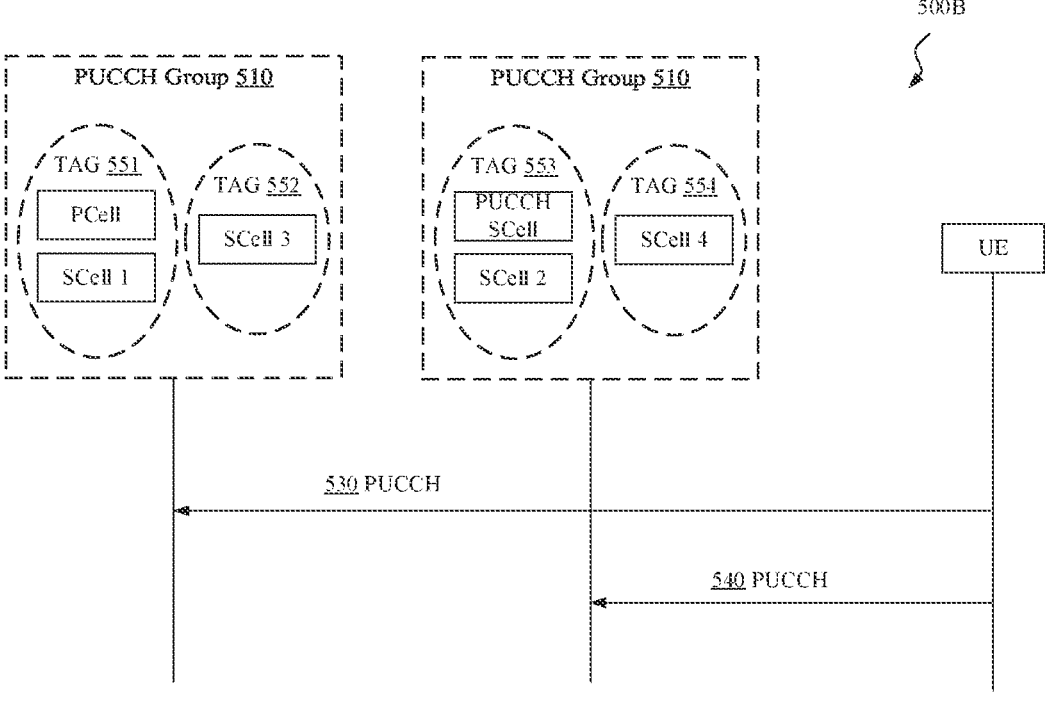
FIG. 5B illustrates a scenario with multiple TAGs in the same PUCCH group in accordance with some embodiments.

In some embodiments, each of the one or more TAGs is associated with one PUCCH group of the plurality of PUCCH groups, and one PUCCH group is associated with at least one of the one or more TAGs. FIG. 5B illustrates a scenario 500B with multiple TAGs in the same PUCCH group in accordance with some embodiments. In FIG. 5B, reference signs which are the same as in the FIG. 5A denote the same elements and description of which will not be repeated here. As depicted in FIG. 5B, the plurality of cells, e.g., PCell, PUCCH SCell to be activated, SCell 1.

SCell 2, SCell 3 and SCell 4, are associated with one or more TAGs (TAG 551, TAG 552, TAG 553 and TAG 554). Each TAG is associated with one PUCCH group in NR-CA and DC. Multiple TAGs may be configured under one PUCCH group. For example, TAG 551 and TAG 552 are configured under the same PUCCH group 510.

Figure 5C:
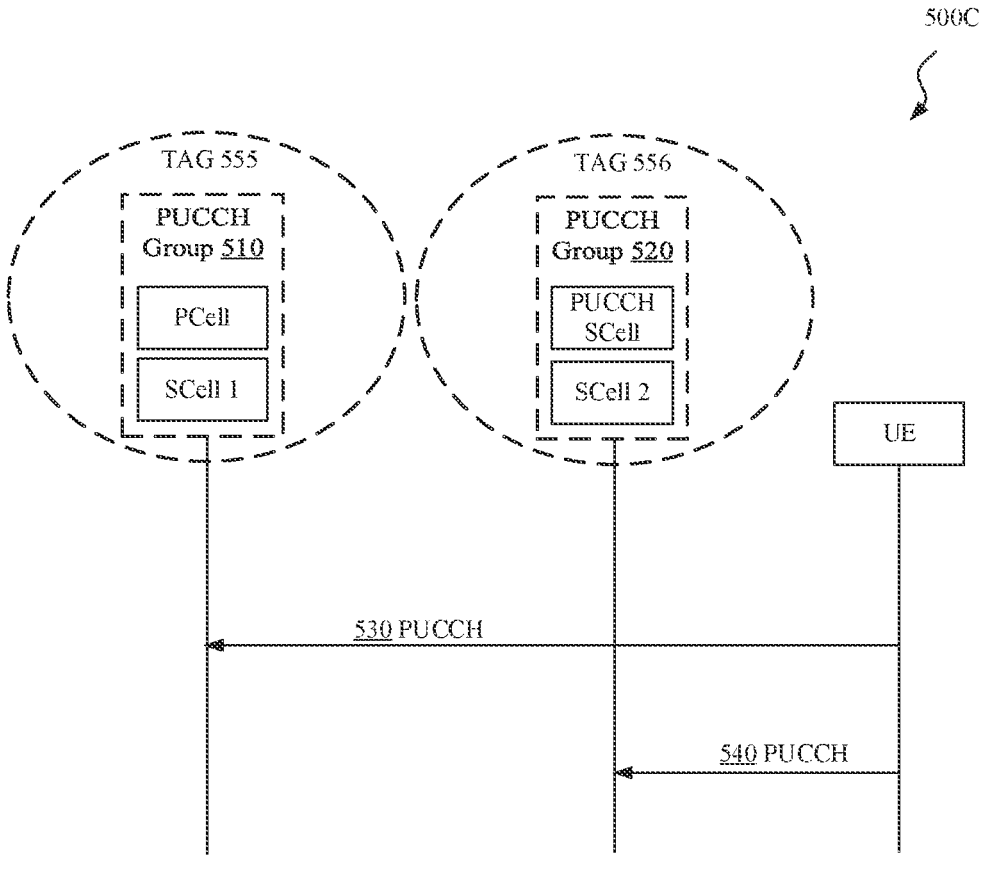
FIG. 5C illustrates a scenario with one TAG associates with one PUCCH group.

In some embodiments, the plurality of PUCCH groups is associated with the one or more TAGs in one-to-one correspondence. FIG. 5C illustrates a scenario 500C with one TAG associates with one PUCCH group. In FIG. 5C, reference signs which are the same as in the FIG. 5A denote the same elements and description of which will not be repeated here. As depicted in FIG. 5C, the plurality of cells, e.g., PCell, PUCCH SCell to be activated. SCell 1 and SCell 2, are associated with one or more TAGs (TAG 555 and TAG 556). The one or more TAGs and the plurality of PUCCH groups follow a one to one mapping rule.

In some implementations, the plurality of PUCCH groups comprises at least one intra-band PUCCH group and at least one inter-band PUCCH group. Each intra-band PUCCH group comprises intra-band aggregated cells, and each inter-band PUCCH group comprises inter-band aggregated cells.

In some implementations, the at least one intra-band PUCCH group is associated with one of the one or more TAGs. In some variants, each of the at least one inter-band PUCCH group is associated with at least one of the one or more TAGs. For example, intra-band PUCCH groups are associated with one TAG in NR-CA or DC, but inter-band PUCCH groups are associated with one or more TAG in NR-CA or DC respectively.

In some implementations, the at least one intra-band TAG is associated with one of the one or more PUCCH groups. In some variants, each of the at least one inter-band TAG is associated with at least one of the one or more PUCCH groups. For example, intra-band TAGs are associated with one PUCCH group in NR-CA and DC, but inter-band TAGs are associated with one or more PUCCH group in NR-CA and DC respectively.

In some examples, the one or more TAGs comprise a single TAG. The single TAG comprises the active serving cell and the PUCCH secondary cell, and the performing the operations (step 320 in FIG. 3) comprises: determining a timing for the activation for the PUCCH secondary cell. For example. FIG. 5A shows a single TAG 550. Both PCell and PUCCH SCell belong to TAG 550. When UE performs the operations for activation of PUCCH SCell, UE may first determine a timing during the activation.

In some embodiments, the timing for the activation is the same as a transmission timing of the active serving cell in the same TAG. For example, in FIG. 5A, PCell and PUCCH SCell are in the same TAG 550. UE may assume the time advance (TA) is valid for PCell, regardless of timeAlignmentTimer status (i.e., running or not). The PUCCH timing of the PUCCH SCell to be activated may follow the same transmission timing of one of other active service cells in the same TAG. For example, in FIG. 5A. PCell and SCell 1 are active serving cells. PUCCH SCell. PCell and SCell 1 are in the same TAG 550. In this case, the PUCCH timing of the PUCCH SCell may be the same as the transmission timing of PCell or SCell 1.

In some embodiments, the timeAlignmentTimer status is considered. In some implementations, a timeAlignmentTimer associated with the single TAG is not running, and determining the timing for the activation may trigger a RACH procedure.

Figure 6:
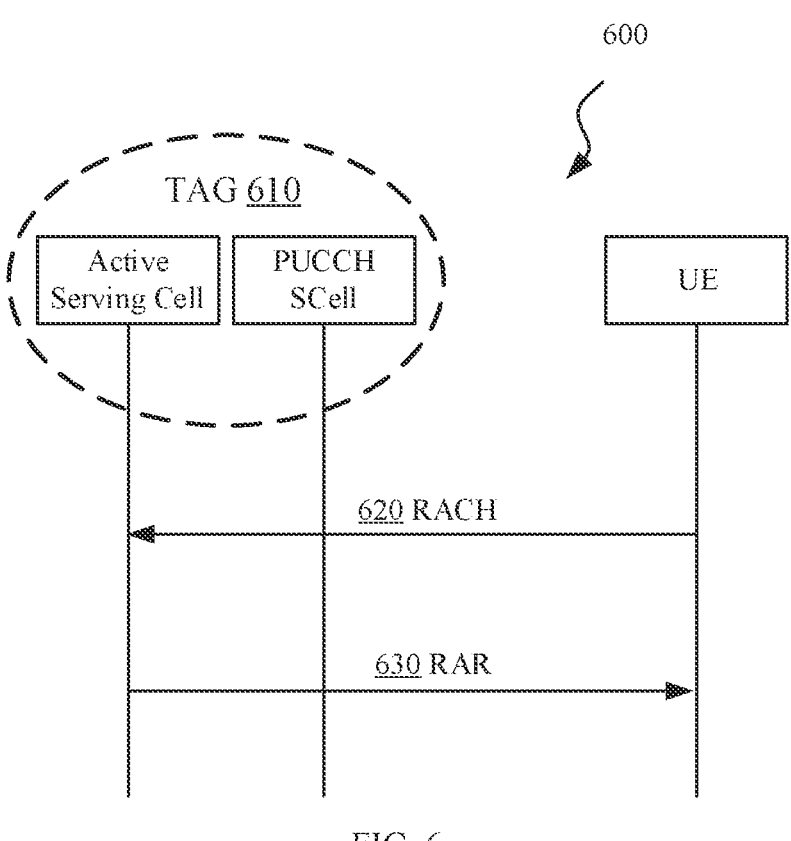
FIG. 6 illustrates a transmit scenario for a RACH occasion and response between a UE and a BS in accordance with some embodiments.

FIG. 6 illustrates a transmit scenario 600 for a RACH occasion and response between a UE and a BS in accordance with some embodiments. As shown in FIG. 6, active serving cell and PUCCH SCell are in the same TAG 610. The timeAlignmentTimer associated with the TAG 610 is not running. UE may perform a RACH procedure 620 on the active serving cell. UE then receives a random access response (RAR) 630 with TA information. UE will determine a transmission timing based on the TA information as the timing for the activation. In some implementations, the active serving cell is a primary cell (PCell), a primary secondary cell (PSCell) or an active secondary cell (SCell).

In some examples, when TAG 610 is pTAG, which means that the active serving cell is PCell, and that PCell and PUCCH SCell are in the same TAG 610 but different PUCCH groups. UE may trigger the RACH 620 on PCell. After receiving the RAR 630 with TA information from PCell. UE may apply this new/recovered PCell transmission time with new TA information to the transmission time of PUCCH SCell. In another example, when TAG 610 is sTAG, which means PSCell or another active SCell, and the PUCCH SCell are in the same TAG 610 but different PUCCH groups. UE may trigger the RACH 620 on PSCell or another active SCell. After receiving the RAR 630 with TA information from PSCell or another active SCell. UE may apply this new/recovered transmission timing with new TA information to the transmission timing of the PUCCH SCell.

Figure 7:
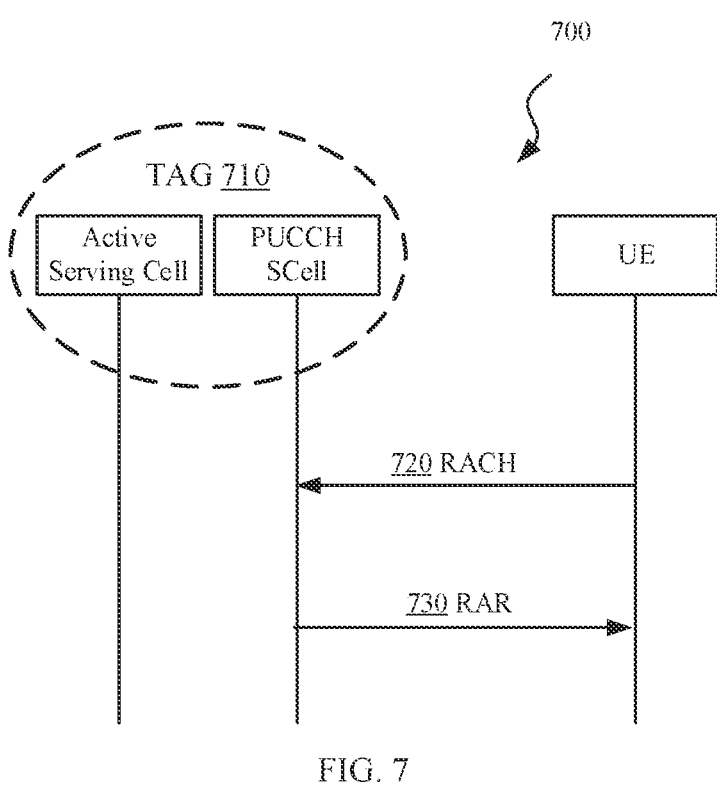
FIG. 7 illustrates another transmit scenario for a RACH occasion and response between a UE and a BS in accordance with some embodiments.

FIG. 7 illustrates another transmit scenario 700 for a RACH occasion and response between a UE and a BS in accordance with some embodiments. As shown in FIG. 7, active serving cell and PUCCH SCell are in the same TAG 710. The timeAlignmentTimer associated with the TAG 710 is not running. UE may perform a RACH procedure 720 on the PUCCH SCell. UE then receives a RAR 730 with TA information. UE will determine the timing for the activation based on the TA information and apply the timing for the activation to the active serving cell.

In some examples, when TAG 710 is pTAG, which means that the active serving cell is PCell, and that PCell and PUCCH SCell are in the same TAG 710 but different PUCCH groups. UE may trigger the RACH 720 on PUCCH SCell. After receiving the RAR 730 with TA information from PUCCH SCell, UE may apply this new/recovered transmission timing with new TA information to the transmission timing of PCell. In another example, when TAG 710 is sTAG, which means PSCell or another active SCell, and the PUCCH SCell are in the same TAG 710 but different PUCCH groups. UE may trigger the RACH 720 on the PUCCH SCell. After receiving the RAR 730 with TA information from the PUCCH SCell, UE may apply this new/recovered transmission timing with new TA information to the transmission timing of the PSCell or another active SCell.

In some embodiments, the timing for the activation is different from a transmission timing of the active serving cell indicated in the same TAG. For example, as long as different PUCCH groups are configured, the active serving cell in one PUCCH group and the PUCCH SCell in the different PUCCH group may maintain their timing separately.

Thus, depending on relations between different PUCCH groups and different TAGs, UE will use different configurations as described in the embodiments, to determine timing information during the activation of PUCCH SCell. The flexibility of configurations and the behavior of the UE are improved.

Figure 8:
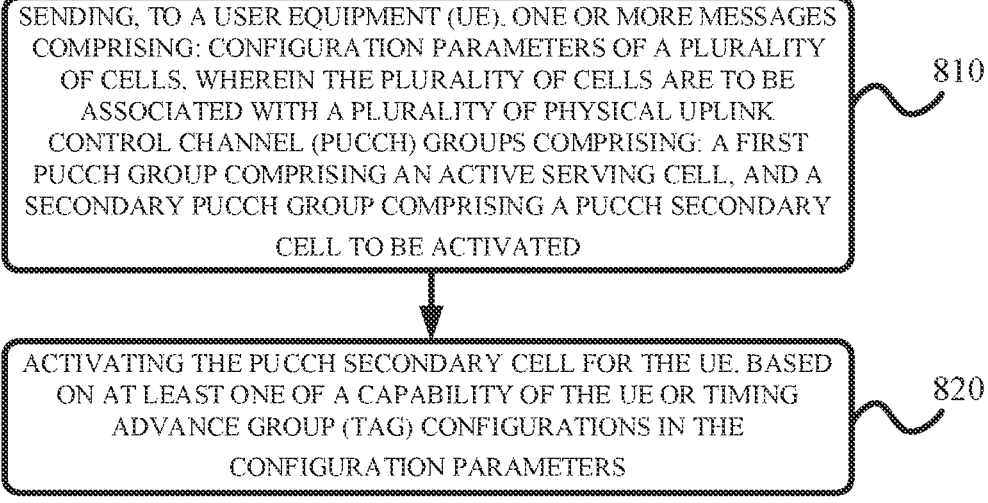
FIG. 8 illustrates a flowchart for a method performed by a BS in accordance with some embodiments.

FIG. 8 illustrates a flowchart for a method 800 performed by a BS in accordance with some embodiments. As shown in FIG. 8, method 800 comprises steps 810 and 820.

In step 810, sending, to a user equipment (UE), one or more messages comprising: configuration parameters of a plurality of cells, wherein the plurality of cells are to be associated with a plurality of physical uplink control channel (PUCCH) groups comprising: a first PUCCH group comprising an active serving cell, and a secondary PUCCH group comprising a PUCCH secondary cell to be activated.

In step 820, activating the PUCCH secondary cell for the UE, based on at least one of a capability of the UE or timing advance group (TAG) configurations in the configuration parameters.

Figure 9:
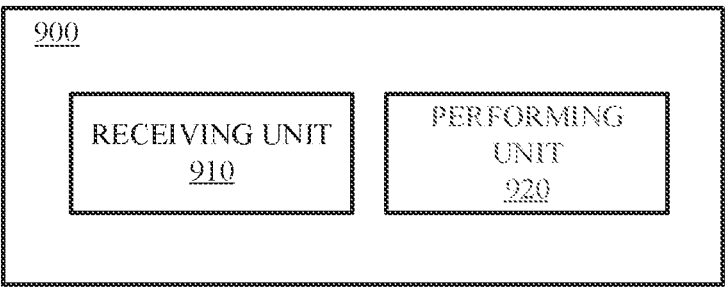
FIG. 9 illustrates a block diagram of an apparatus for a UE in accordance with some embodiments.

FIG. 9 illustrates a block diagram of an apparatus 900 for a UE in accordance with some embodiments. The apparatus 900 illustrated in FIG. 9 may comprise one or more processors configured to perform steps of the method 300 as illustrated in combination with FIG. 3. As shown in FIG. 9, the apparatus 900 includes receiving unit 910 and performing unit 920.

The receiving unit 910 is configured to receive, from a base station (BS), one or more messages comprising: configuration parameters of a plurality of cells, wherein the plurality of cells are to be associated with a plurality of physical uplink control channel (PUCCH) groups comprising: a first PUCCH group comprising an active serving cell, and a secondary PUCCH group comprising a PUCCH secondary cell to be activated.

The performing unit 920 is configured to perform operations during activation of the PUCCH secondary cell based on at least one of a capability of the UE or timing advance group (TAG) configurations in the configuration parameters.

Figure 10:
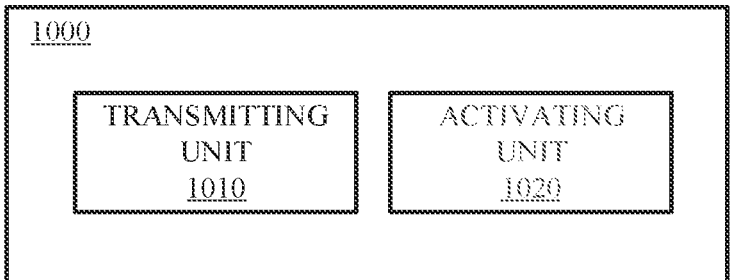
FIG. 10 illustrates a block diagram of an apparatus for a BS in accordance with some embodiments.

FIG. 10 illustrates a block diagram of an apparatus 1000 for a BS in accordance with some embodiments. The apparatus 1000 illustrated in FIG. 10 may comprise one or more processors configured to perform steps of the method 800 as illustrated in combination with FIG. 8. As shown in FIG. 10, the apparatus 1000 includes sending unit 1010 and activating unit 1020.

The transmitting unit 1010 is configured to send, to a user equipment (UE), one or more messages comprising: configuration parameters of a plurality of cells, wherein the plurality of cells are associated with a plurality of physical uplink control channel (PUCCH) groups comprising: a first PUCCH group comprising an active serving cell, and a secondary PUCCH group comprising a PUCCH secondary cell to be activated.

The activating unit 1020 is configured to activate the PUCCH secondary cell for the UE, based on at least one of a capability of the UE or timing advance group (TAG) configurations in the configuration parameters.

Figure 11:
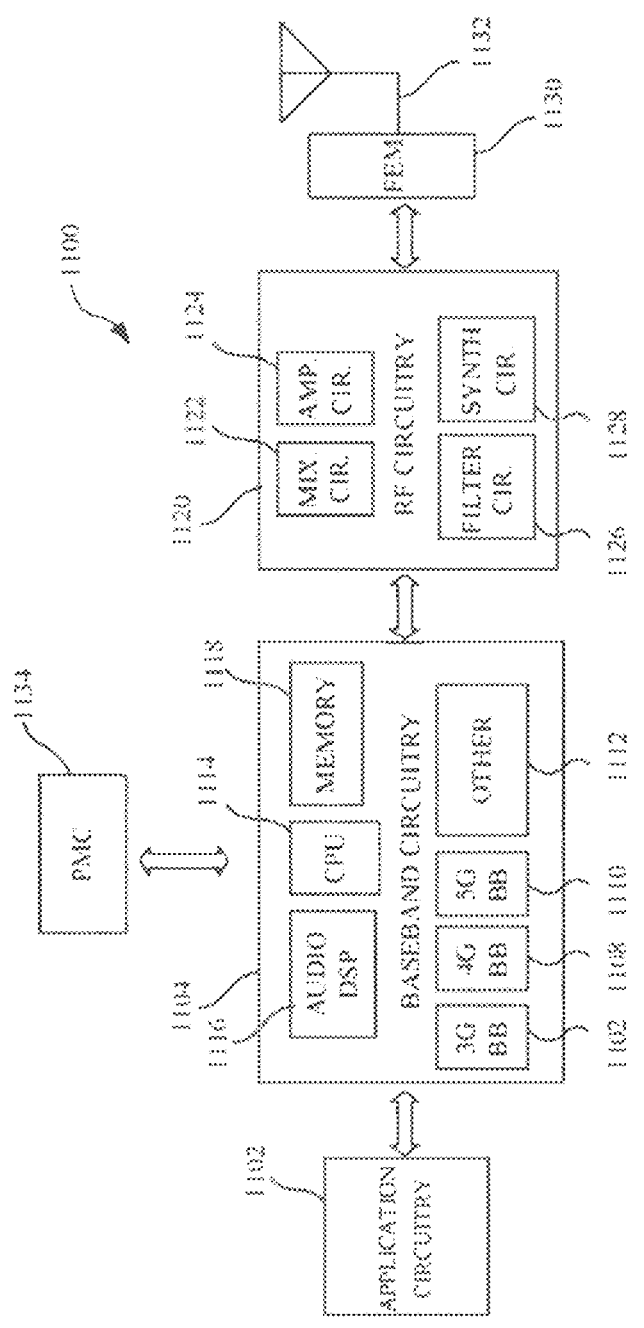
FIG. 11 illustrates a communication device (e.g., a UE or a base station) in accordance with some embodiments.

FIG. 11 illustrates example components of a device 1100 in accordance with some embodiments. In some embodiments, the device 1100 may include application circuitry 1102, baseband circuitry 1104, Radio Frequency (RF) circuitry (shown as RF circuitry 1120), front-end module (FEM) circuitry (shown as FEM circuitry 1130), one or more antennas 1132, and power management circuitry (PMC) (shown as PMC 1134) coupled together at least as shown. The components of the illustrated device 1100 may be included in a UE or a RAN node. In some embodiments, the device 1100 may include fewer elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1120 and to generate baseband signals for a transmit signal path of the RF circuitry 1120. The baseband circuitry 1104 may interface with the application circuitry 1102 for generation and processing of the baseband signals and for controlling operations of the RF circuitry 1120. For example, in some embodiments, the baseband circuitry 1104 may include a third generation (3G) baseband processor (3G baseband processor 1106), a fourth generation (4G) baseband processor (4G baseband processor 1108), a fifth generation (5G) baseband processor (G baseband processor 1110), or other baseband processor(s) 1112 for other existing generations, generations in development or to be developed in the future (e.g., second generation (2G), sixth generation (6G), etc.). The baseband circuitry 1104 (e.g., one or more of baseband processors) may handle various radio control functions that enable communication with one or more radio networks via the RF circuitry 1120. In other embodiments, some or all of the functionality of the illustrated baseband processors may be included in modules stored in the memory 1118 and executed via a Central Processing ETnit (CPET 1114). The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include a digital signal processor (DSP), such as one or more audio DSP(s) 1116. The one or more audio DSP(s) 1116 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1104 is configured to support radio communications of more than one wireless protocol may be referred to as multi-mode baseband circuitry.

The RF circuitry 1120 may enable communication with wireless networks using modulated electromagnetic radiation through a non-solid medium. In various embodiments, the RF circuitry 1120 may include switches, filters, amplifiers, etc, to facilitate the communication with the wireless network. The RF circuitry 1120 may include a receive signal path which may include circuitry to down-convert RF signals received from the FEM circuitry 1130 and provide baseband signals to the baseband circuitry 1104. The RF circuitry 1120 may also include a transmit signal path which may include circuitry to up-convert baseband signals provided by the baseband circuitry 1104 and provide RF output signals to the FEM circuitry 1130 for transmission. [0141] In some embodiments, the receive signal path of the RF circuitry 1120 may include mixer circuitry 1122, amplifier circuitry 1124 and filter circuitry 1126. In some embodiments, the transmit signal path of the RF circuitry 1120 may include filter circuitry 1126 and mixer circuitry 1122. The RF circuitry 1120 may also include synthesizer circuitry 1128 for synthesizing a frequency for use by the mixer circuitry 1122 of the receive signal path and the transmit signal path. In some embodiments, the mixer circuitry 1122 of the receive signal path may be configured to down-convert RF signals received from the FEM circuitry 1130 based on the synthesized frequency provided by synthesizer circuitry 1128. The amplifier circuitry 1124 may be configured to amplify the down-converted signals and the filter circuitry 1126 may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, the mixer circuitry 1122 of the receive signal path may comprise passive mixers, although the scope of the embodiments is not limited in this respect.

In some embodiments, the mixer circuitry 1122 of the transmit signal path may be configured to up-convert input baseband signals based on the synthesized frequency provided by the synthesizer circuitry 1128 to generate RF output signals for the FEM circuitry 1130. The baseband signals may be provided by the baseband circuitry 1104 and may be filtered by the filter circuitry 1126.

In some embodiments, the mixer circuitry 1122 of the receive signal path and the mixer circuitry 1122 of the transmit signal path may include two or more mixers and may be arranged for quadrature downconversion and upconversion, respectively. In some embodiments, the mixer circuitry 1122 of the receive signal path and the mixer circuitry 1122 of the transmit signal path may include two or more mixers and may be arranged for image rejection (e.g., Hartley image rejection). In some embodiments, the mixer circuitry 1122 of the receive signal path and the mixer circuitry 1122 may be arranged for direct downconversion and direct upconversion, respectively. In some embodiments, the mixer circuitry 1122 of the receive signal path and the mixer circuitry 1122 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1120 may include analog-to-digital converter (ADC) and digital-to-analog converter (DAC) circuitry and the baseband circuitry 1104 may include a digital baseband interface to communicate with the RF circuitry 1120.

In some dual-mode embodiments, a separate radio IC circuitry may be provided for processing signals for each spectrum, although the scope of the embodiments is not limited in this respect.

In some embodiments, the synthesizer circuitry 1128 may be a fractional –N synthesizer or a fractional N/N+1 synthesizer, although the scope of the embodiments is not limited in this respect as other types of frequency synthesizers may be suitable. For example, synthesizer circuitry

1128 may be a delta-sigma synthesizer, a frequency multiplier, or a synthesizer comprising a phase-locked loop with a frequency divider.

The synthesizer circuitry 1128 may be configured to synthesize an output frequency for use by the mixer circuitry 1122 of the RF circuitry 1120 based on a frequency input and a divider control input. In some embodiments, the synthesizer circuitry 1128 may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1102 (such as an applications processor) depending on the desired output frequency. In some embodiments, a divider control input (e.g., N) may be determined from a look-up table based on a channel indicated by the application circuitry 1102.

Synthesizer circuitry 1128 of the RF circuitry 1120 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1128 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1120 may include an IQ/polar converter.

The FEM circuitry 1130 may include a receive signal path which may include circuitry configured to operate on RF signals received from one or more antennas 1132, amplify the received signals and provide the amplified versions of the received signals to the RF circuitry 1120 for further processing. The FEM circuitry 1130 may also include a transmit signal path which may include circuitry configured to amplify signals for transmission provided by the RF circuitry 1120 for transmission by one or more of the one or more antennas 1132. In various embodiments, the amplification through the transmit or receive signal paths may be done solely in the RF circuitry 1120, solely in the FEM circuitry 1130, or in both the RF circuitry 1120 and the FEM circuitry 1130.

In some embodiments, the FEM circuitry 1130 may include a TX/RX switch to switch between transmit mode and receive mode operation. The FEM circuitry 1130 may include a receive signal path and a transmit signal path. The receive signal path of the FEM circuitry 1130 may include an LNA to amplify received RF signals and provide the amplified received RF signals as an output (e.g., to the RF circuitry 1120). The transmit signal path of the FEM circuitry 1130 may include a power amplifier (PA) to amplify input RF signals (e.g., provided by the RF circuitry 1120), and one or more filters to generate RF signals for subsequent transmission (e.g., by one or more of the one or more antennas 1132).

In some embodiments, the PMC 1134 may manage power provided to the baseband circuitry 1104. In particular, the PMC 1134 may control power-source selection, voltage scaling, battery charging, or DC-to-DC conversion. The PMC 1134 may often be included when the device 1100 is capable of being powered by a battery, for example, when the device 1100 is included in a EGE. The PMC 1134 may increase the power conversion efficiency while providing desirable implementation size and heat dissipation characteristics.

FIG. 11 shows the PMC 1134 coupled only with the baseband circuitry 1104. However, in other embodiments, the PMC 1134 may be additionally or alternatively coupled with, and perform similar power management operations for, other components such as, but not limited to, the application circuitry 1102, the RF circuitry 1120, or the FEM circuitry 1130.

In some embodiments, the PMC 1134 may control, or otherwise be part of, various power saving mechanisms of the device 1100. For example, if the device 1100 is in an RRC Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used to execute Layer 3, Layer 2, or Layer 1 functionality, while processors of the application circuitry 1102 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
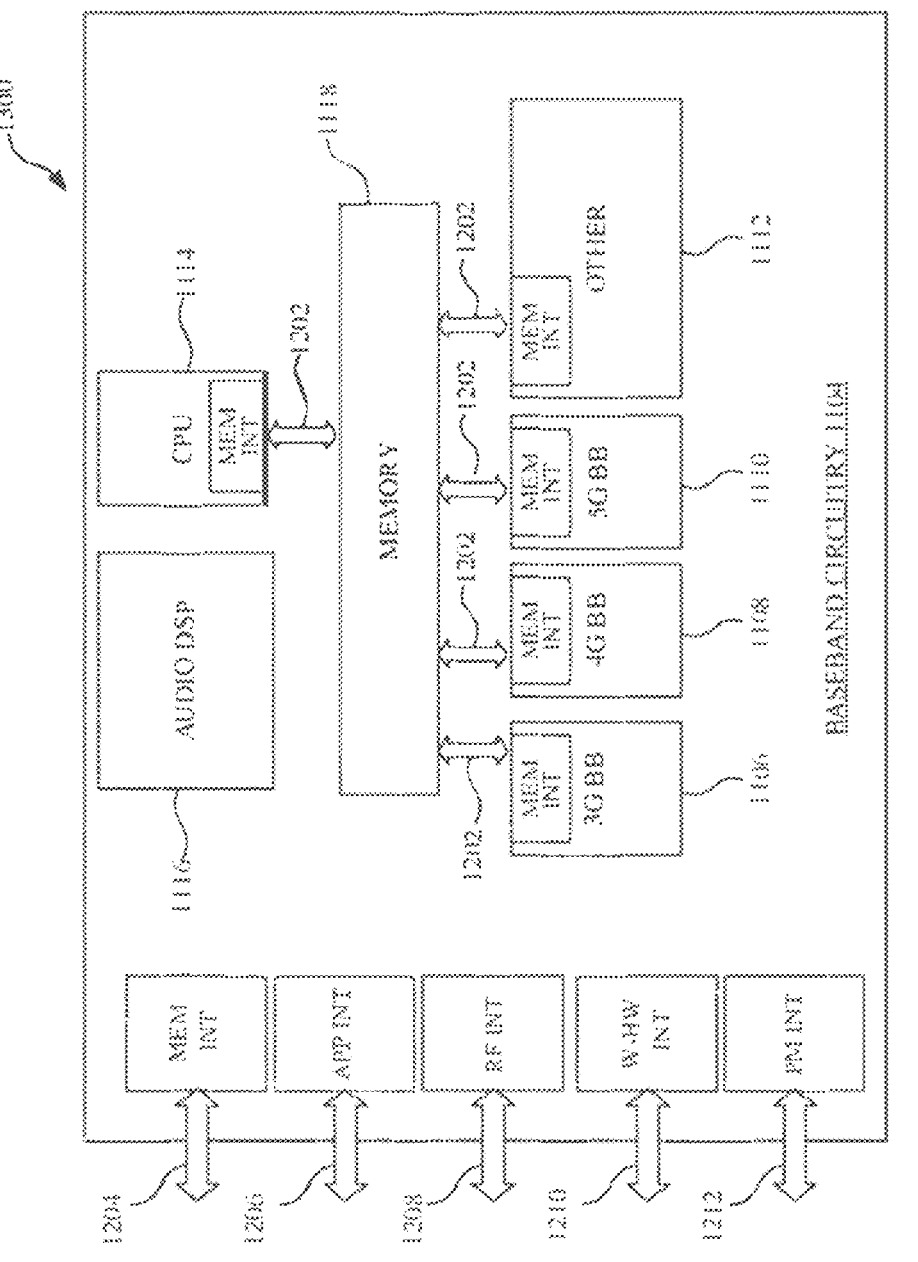
FIG. 12 illustrates example interfaces of baseband circuitry in accordance with some embodiments.

FIG. 12 illustrates example interfaces 1200 of baseband circuitry in accordance with some embodiments. As discussed above, the baseband circuitry 1104 of FIG. 11 may comprise 3G baseband processor 1106, 4G baseband processor 1208, 5G baseband processor 1110, other baseband processor(s) 1112. CPU 1114, and a memory 1218 utilized by said processors. As illustrated, each of the processors may include a respective memory interface 1202 to send/receive data to/from the memory 1218.

The baseband circuitry 1104 may further include one or more interfaces to communicatively couple to other circuitries/devices, such as a memory interface 1204 (e.g., an interface to send/receive data to/from memory external to the baseband circuitry 1204), an application circuitry interface 1206 (e.g., an interface to send/receive data to/from the application circuitry 1102 of FIG. 11), an RF circuitry interface 1208 (e.g., an interface to send/receive data to/from RF circuitry 1120 of FIG. 11), a wireless hardware connectivity interface 1210 (e.g., an interface to send/receive data to/from Near Field Communication (NFC) components, Bluetooth® components (e.g., Bluetooth® Low Energy). Wi-Fi® components, and other communication components), and a power management interface 1212 (e.g., an interface to send/receive power or control signals to/from the PMC 1124.

Figure 13:
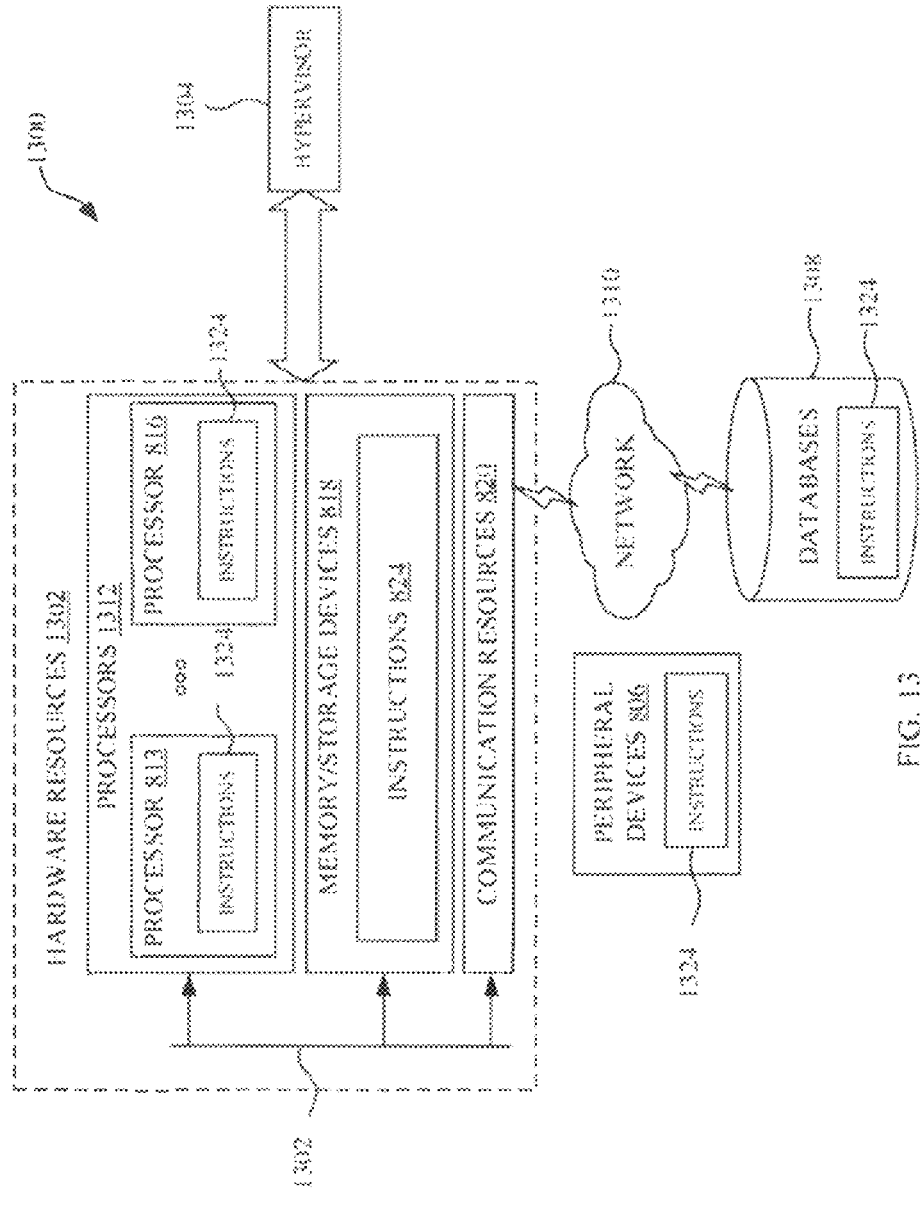
FIG. 13 illustrates components in accordance with some embodiments.

FIG. 13 is a block diagram illustrating components 1300, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1302 including one or more processors 1312 (or processor cores), one or more memory/storage devices 1318, and one or more communication resources 1320, each of which may be communicatively coupled via a bus 1322. For embodiments where node virtualization (e.g., NFV) is utilized, a hypervisor 1304 may be executed to provide an execution environment for one or more network slices/sub-slices to utilize the hardware resources 1302.

The processors 1312 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1314 and a processor 1316.

The memory/storage devices 1318 may include main memory, disk storage, or any suitable combination thereof. The memory/storage devices 1318 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1320 may include interconnection or network interface components or other suitable devices to communicate with one or more peripheral devices 1306 or one or more databases 1308 via a network 1310. For example, the communication resources 1320 may include wired communication components (e.g., for coupling via a Universal Serial Bus (USB)), cellular communication components, NFC components. Bluetooth® components (e.g., Bluetooth®, Low Energy), Wi-Fi® components, and other communication components.

Instructions 1324 may comprise software, a program, an application, an applet, an app, or other executable code for causing at least any of the processors 1312 to perform any one or more of the methodologies discussed herein. The instructions 1324 may reside, completely or partially, within at least one of the processors 1312 (e.g., within the processor's cache memory), the memory/storage devices 1318, or any suitable combination thereof. Furthermore, any portion of the instructions 1324 may be transferred to the hardware resources 1302 from any combination of the peripheral devices 1306 or the databases 1308. Accordingly, the memory of the processors 1312, the memory/storage devices 1318, the peripheral devices 1306, and the databases 1308 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc, as described above in connection with one or more of the preceding figures may be configured to operate in accordance with one or more of the examples set forth below in the example section.

Figure 14:
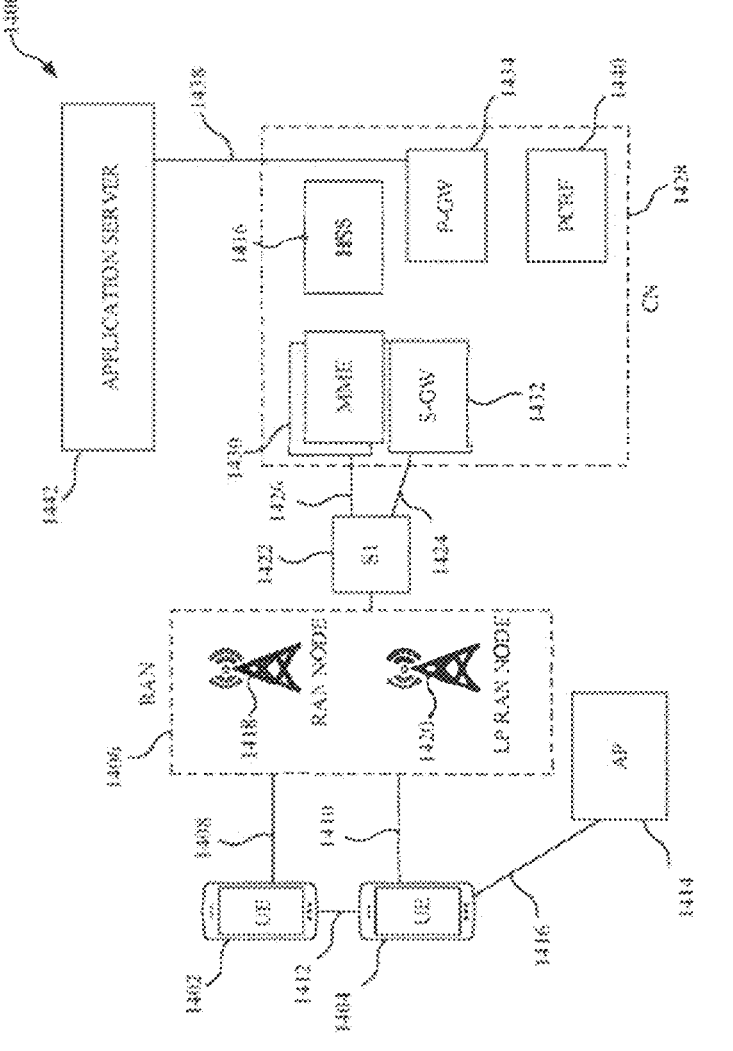
FIG. 14 illustrates an architecture of a wireless network in accordance with some embodiments.

FIG. 14 illustrates an architecture of a system 1400 of a network in accordance with some embodiments. The system 1400 includes one or more user equipment (UE), shown in this example as a UE 1402 and a UE 1404. The UE 1402 and the UE 1404 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1402 and the UE 1 104 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. [0102] The UE 1402 and the UE 1404 may be configured to connect, e.g., communicatively couple, with a radio access network (RAN), shown as RAN 1406. The RAN 1406 may be, for example, an Evolved ETniversal Mobile Telecommunications System (ETMTS) Terrestrial Radio Access Network (E-UTRAN), a NextGen RAN (NG RAN), or some other type of RAN. The UE 1402 and the UE 1404 utilize connection 1408 and connection 1410, respectively, each of which comprises a physical communications interface or layer (discussed in further detail below); in this example, the connection 1408 and the connection 1410 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1402 and the UE 1404 may further directly exchange communication data via a ProSe interface 1412. The ProSe interface 1412 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1404 is shown to be configured to access an access point (AP), shown as AP 1 144, via connection 1416. The connection 1416 can comprise a local wireless connection, such as a connection consistent with any IEEE 802.14 protocol, wherein the AP 1414 would comprise a wireless fidelity (WiFi®) router. In this example, the AP 1414 may be connected to the Internet without connecting to the core network of the wireless system (described in further detail below).

The RAN 1406 can include one or more access nodes that enable the connection 1408 and the connection 14 10. These access nodes (ANs) can be referred to as base stations (BSs), NodeBs, evolved NodeBs (eNBs), next Generation NodeBs (gNB). RAN nodes, and so forth, and can comprise ground stations (e.g., terrestrial access points) or satellite stations providing coverage within a geographic area (e.g., a cell). The RAN 1406 may include one or more RAN nodes for providing macrocells, e.g., macro RAN node 1418, and one or more RAN nodes for providing femtocells or picocells (e.g., cells having smaller coverage areas, smaller user capacity, or higher bandwidth compared to macrocells), e.g., a low power (LP) RAN node such as LP RAN node 1420. [0106] Any of the macro RAN node 1418 and the LP RAN node 1420 can terminate the air interface protocol and can be the first point of contact for the UE 1402 and the UE 1404. In some embodiments, any of the macro RAN node 1418 and the LP RAN node 1420 can fulfill various logical functions for the RAN 1406 including, but not limited to, radio network controller (RNC) functions such as radio bearer management, uplink and downlink dynamic radio resource management and data packet scheduling, and mobility management.

In accordance with some embodiments, the EGE 1402 and the EGE 1404 can be configured to communicate using Orthogonal Frequency-Division Multiplexing (OFDM) communication signals with each other or with any of the macro RAN node 1418 and the LP RAN node 1420 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1418 and the LP RAN node 1420 to the UE 1402 and the UE 1404, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1402 and the UE 1404. The physical downlink control channel (PDCCH) may carry information about the transport format and resource allocations related to the PDSCH channel, among other things. It may also inform the UE 1402 and the UE 1404 about the transport format, resource allocation, and H-ARQ (Hybrid Automatic Repeat Request) information related to the uplink shared channel. Typically, downlink scheduling (assigning control and shared channel resource blocks to the UE 1404 within a cell) may be performed at any of the macro RAN node 1418 and the LP RAN node 1420 based on channel quality information fed back from any of the UE 1402 and UE 1404. The downlink resource assignment information may be sent on the PDCCH used for (e.g., assigned to) each of the UE 1402 and the UE 1404.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level. L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1406 is communicatively coupled to a core network (CN), shown as CN 1428—via an S1 interface 1422. In embodiments, the CN 1428 may be an evolved packet core (EPC) network, a NextGen Packet Core (NPC)

network, or some other type of CN. In this embodiment the S1 interface 1422 is split into two parts: the S1-U interface 1424, which carries traffic data between the macro RAN node 1418 and the LP RAN node 1420 and a serving gateway (S-GW), shown as S-GW 1 132, and an S1-mobility management entity (MME) interface, shown as S1-MME interface 1426, which is a signaling interface between the macro RAN node 1418 and LP RAN node 1420 and the MME(s) 1430. [0143] In this embodiment, the CN 1428 comprises the MME(s) 1430, the S-GW 1432, a Packet Data Network (PDN) Gateway (P-GW) (shown as P-GW 1434), and a home subscriber server (HSS) (shown as HSS 1436). The MME(s) 1430 may be similar in function to the control plane of legacy Serving General Packet Radio Service (GPRS) Support Nodes (SGSN). The MME(s) 1430 may manage mobility aspects in access such as gateway selection and tracking area list management. The HSS 1436 may comprise a database for network users, including subscription-related information to support the network entities' handling of communication sessions. The CN 1428 may comprise one or several HSS 1436, depending on the number of mobile subscribers, on the capacity of the equipment, on the organization of the network, etc. For example, the HSS 1436 can provide support for routing/roaming, authentication, authorization, naming/addressing resolution, location dependencies, etc.

The S-GW 1432 may terminate the S1 interface 322 towards the RAN 1406, and mutes data packets between the RAN 1406 and the CN 1428. In addition, the S-GW 1432 may be a local mobility anchor point for inter-RAN node handovers and also may provide an anchor for inter-3 GPP mobility. Other responsibilities may include lawful intercept, charging, and some policy enforcement.

The P-GW 1434 may terminate an SGi interface toward a PDN. The P-GW 1434 may route data packets between the CN 1428 (e.g., an EPC network) and external networks such as a network including the application server 1442 (alternatively referred to as application function (AF)) via an Internet Protocol (IP) interface (shown as IP communications interface 1438). Generally, an application server 1442 may be an element offering applications that use IP bearer resources with the core network (e.g., ETMTS Packet Services (PS) domain, LTE PS data services, etc.). In this embodiment, the P-GW 1434 is shown to be communicatively coupled to an application server 1442 via an IP communications interface 1438. The application server 1442 can also be configured to support one or more communication services (e.g., Voice-over-Internet Protocol (VoIP) sessions, PTT sessions, group communication sessions, social networking services, etc.) for the UE 1402 and the UE 1404 via the CN 1428.

The P-GW 1434 may further be a node for policy enforcement and charging data collection. A Policy and Charging Enforcement Function (PCRF) (shown as PCRF 1440) is the policy and charging control element of the CN 1428. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1440 may be communicatively coupled to the application server 1442 via the P-GW 1434. The application server 1442 may signal the PCRF 1440 to indicate a new service flow and select the appropriate Quality of Service (QoS) and charging parameters. The PCRF 1440 may provision this rule into a Policy and Charging Enforcement Function (PCEF) (not shown) with the appropriate traffic flow template (TFT) and QoS class of identifier (QCI), which commences the QoS and charging as specified by the application server 1442.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc, as described above in connection with one or more of the preceding figures may be configured to operate in accordance with one or more of the examples set forth below in the example section.

The following examples pertain to further embodiments.

Example 1 is a method performed by a user equipment (UE), comprising:
  receiving, from a base station (BS), one or more messages comprising:
    configuration parameters of a plurality of cells, wherein the plurality of cells are to be associated with a plurality of physical uplink control channel (PUCCH) groups comprising:
      a first PUCCH group comprising an active serving cell, and
      a secondary PUCCH group comprising a PUCCH secondary cell to be activated; and
    performing operations during activation of the PUCCH secondary cell based on at least one of a capability of the UE or timing advance group (TAG) configurations in the configuration parameters.

Example 2 is the method of example 1, wherein the capability of the UE comprises a first capability of whether the UE supports different numerologies between a random access channel (RACH) in the secondary PUCCH group and channels in the first PUCCH group during the activation of the PUCCH secondary cell.

Example 3 is the method of example 2, wherein the configuration parameters indicate that the active serving cell and the PUCCH secondary cell are intra-band aggregated.

Example 4 is the method of example 2 or 3, wherein the first capability is indicated by an information element (LE) which is an extended version of diffNumerologyAcross-PUCCH-Group, wherein the IE indicates whether the UE supports different numerologies across the first and secondary PUCCH groups for data channel, control channel and RACH.

Example 5 is the method of example 2 or 3, wherein the first capability is indicated by an information element (IE) other than diffNumerologyAcrossPUCCH-Group, wherein the IE indicates whether the UE supports different numerologies between each of the channels in the first PUCCH group and RACH in the secondary PUCCH group during the activation of the PUCCH secondary cell, wherein the channels comprise data channel, control channel and RACH.

Example 6 is the method of example 2, wherein the configuration parameters indicate the active serving cell and the PUCCH secondary cell are inter-band aggregated, and wherein the capability of the UE comprises that the UE supports the different numerologies between each of the channels in the first PUCCH group and RACH in the secondary PUCCH group, wherein the channels comprise data channel, control channel and RACH.

Example 7 is the method of example 2, wherein the capability of the UE comprises that the UE does not support different numerologies, and wherein the operations during the activation of the PUCCH secondary cell comprise a scheduling restriction for the UE.

Example 8 is the method of example 7, wherein the configuration parameters indicate that the different numerologies are configured for the active serving cell and the PUCCH secondary cell, and wherein performing the operations comprises:
  stopping uplink transmission for the active serving cell in the first PUCCH group on first symbols, wherein the first symbols are RACH occasion (RO) symbols for the activation of PUCCH secondary cell or symbols that fully or partially overlap with the RO symbols, wherein the uplink transmission is associated with PUCCH, physical uplink shared channel (PUSCH) or sounding reference signal (SRS).

Example 9 is the method of example 1, wherein the plurality of cells are associated with one or more TAGs based on the TAG configurations.

Example 10 is the method of example 9, wherein each of the plurality of PUCCH groups is associated with one TAG of the one or more TAGs, and wherein the one TAG is associated with at least one of the plurality of PUCCH groups.

Example 11 is the method of example 9, wherein each of the one or more TAGs is associated with one PUCCH group of the plurality of PUCCH groups, and wherein the one PUCCH group is associated with at least one of the one or more TAGs.

Example 12 is the method of example 9, wherein the plurality of PUCCH groups is associated with the one or more TAGs in one-to-one correspondence.

Example 13 is the method of example 9, wherein the plurality of PUCCH groups comprises at least one intra-band PUCCH group and at least one inter-band PUCCH group, wherein each intra-band PUCCH group comprises intra-band aggregated cells, and wherein each inter-band PUCCH group comprises inter-band aggregated cells.

Example 14 is the method of example 13, wherein the at least one intra-band PUCCH group is associated with one of the one or more TAGs.

Example 15 is the method of example 14, wherein each of the at least one inter-band PUCCH group is associated with at least one of the one or more TAGs.

Example 16 is the method of example 13, wherein the at least one intra-band TAG is associated with one of the one or more PUCCH groups.

Example 17 is the method of example 16, wherein each of the at least one inter-band TAG is associated with at least one of the one or more PUCCH groups.

Example 18 is the method of example 9, wherein the one or more TAGs comprise a single TAG, wherein the single TAG comprises the active serving cell and the PUCCH secondary cell, and wherein performing the operations comprises:
  determining a timing for the activation for the PUCCH secondary cell.

Example 19 is the method of example 18, wherein the timing for the activation is the same as a transmission timing of the active serving cell in the same TAG.

Example 20 is the method of example 18, wherein a timeAlignmentTimer associated with the single TAG is not running, and wherein determining the timing for the activation comprises:

performing a random access channel (RACH) procedure on the active serving cell;

receiving a random access response (RAR) with timing advance (TA) information; and determining a transmission timing based on the TA information as the timing for the activation.

Example 21 is the method of example 18, wherein a timeAlignmentTimer associated with the single TAG is not running, and wherein determining the timing for the activation comprises:

performing a random access channel (RACH) procedure on the PUCCH secondary cell;

receiving a random access response (RAR) with timing advance (TA) information;

determining the timing for the activation based on the TA information; and applying the timing for the activation to the active serving cell.

Example 22 is the method of example 18, wherein the timing for the activation is different from a transmission timing of the active serving cell indicated in the same TAG.

Example 23 is the method of any one of examples 18-22, wherein the active serving cell is a primary cell, a primary secondary cell or an active secondary cell.

Example 24 is a method performed by a user equipment (UE), comprising:

receiving. from a base station (BS), first one or more messages comprising:

a request for capability information of the UE, and configuration parameters of a plurality of cells, wherein the plurality of cells are to be associated with a plurality of physical uplink control channel (PUCCH) groups comprising:

a first PUCCH group comprising an active serving cell, and a secondary PUCCH group comprising a PUCCH secondary cell to be activated, and transmitting, to the BS second one or more messages indicating the capability information of the UE, wherein the capability information is used for operations performed by the UE during activation of the PUCCH secondary cell.

Example 25 is the method of example 24, wherein the first one or more messages comprise UECapabilityEnquiry.

Example 26 is the method of example 25, wherein the second one or more messages comprise UECapabilityInformation.

Example 27 is a method performed by a base station (BS), comprising:

transmitting, to a user equipment (UE), one or more messages comprising:

configuration parameters of a plurality of cells, wherein the plurality of cells are to be associated with a plurality of physical uplink control channel (PUCCH) groups comprising:

a first PUCCH group comprising an active serving cell, and a secondary PUCCH group comprising a PUCCH secondary cell to be activated; and activating the PUCCH secondary cell for the UE, based on at least one of a capability of the UE or timing advance group (TAG) configurations in the configuration parameters.

Example 28 is the method of example 27, wherein the capability of the UE comprises a first capability of whether the UE supports different numerologies between a random access channel (RACH) in the secondary PUCCH group and channels in the first PUCCH group during the activation of the PUCCH secondary cell.

Example 29 is the method of example 28, wherein the configuration parameters indicate that the active serving cell and the PUCCH secondary cell are intra-band aggregated.

Example 30 is the method of example 28 or 29, wherein the first capability is indicated by an information element (IE) which is an extended version of diffNumerologyAcrossPUCCH-Group, wherein the IE indicates whether the UE supports different numerologies across the first and secondary PUCCH groups for data channel, control channel and RACH.

Example 31 is the method of example 28 or 29, wherein the first capability is indicated by an information element (IE) other than diffNumerologyAcrossPUCCH-Group, wherein the IE indicates whether the UE supports different numerologies between each of the channels in the first PUCCH group and RACH in the secondary PUCCH group, wherein the channels comprise data channel, control channel and RACH.

Example 32 is the method of example 28, wherein the configuration parameters indicate the active serving cell and the PUCCH secondary cell are inter-band aggregated, and wherein the capability of the UE comprises that the UE supports the different numerologies between each of the channels in the first PUCCH group and RACH in the secondary PUCCH group, wherein the channels comprise data channel, control channel and RACH.

Example 33 is the method of 28, wherein the capability of the UE indicates that the UE does not support different numerologies, and wherein the configuration parameters comprise a scheduling restriction for the BS.

Example 34 is the method of example 33, wherein the scheduling restriction indicates that the same numerologies are configured between an uplink channel in the first PUCCH group and RACH in the secondary PUCCH group, wherein the uplink channel comprises data channel, control channel or RACH.

Example 35 is the method of example 27, wherein the plurality of cells are associated with one or more TAGs based on the TAG configurations.

Example 36 is the method of example 35, wherein each of the plurality of PUCCH groups is associated with one TAG of the one or more TAGs, and wherein the one TAG is associated with at least one of the plurality of PUCCH groups.

Example 37 is the method of example 35, wherein each of the one or more TAGs is associated with one PUCCH group of the plurality of PUCCH groups, and wherein the one PUCCH group is associated with at least one of the one or more TAGs.

Example 38 is the method of example 35, wherein the plurality of PUCCH groups is associated with the one or more TAGs in one-to-one correspondence.

Example 39 is the method of example 35, wherein the plurality of PUCCH groups comprises at least one intra-band PUCCH group and at least one inter-band PUCCH group, wherein each intra-band PUCCH group comprises intra-band aggregated cells, and wherein each inter-band PUCCH group comprises inter-band aggregated cells.

Example 40 is the method of example 39, wherein the at least one intra-band PUCCH group is associated with one of the one or more TAGs.

Example 41 is the method of example 40, wherein each of the at least one inter-band PUCCH group is associated with at least one of the one or more TAGs.

Example 42 is the method of example 39, wherein the at least one intra-band TAG is associated with one of the one or more PUCCH groups.

Example 43 is the method of example 42, wherein each of the at least one inter-band TAG is associated with at least one of the one or more PUCCH groups.

Example 44 is the method of example 35, wherein the one or more TAGs comprise a single TAG, wherein the single TAG comprises the active serving cell and the PUCCH secondary cell.

Example 45 is the method of example 44, wherein a timeAlignmentTimer associated with the single TAG is not running, and wherein activating the PUCCH secondary cell for the UE comprises:

receiving, from the UE, a message of a random access channel (RACH) procedure on the active serving cell; and sending, to the UE, a random access response (RAR) with timing advance (TA) information.

Example 46 is the method of example 44 or 45, wherein the active serving cell is a primary cell, a primary secondary cell or an active secondary cell.

Example 47 is a method performed by a base station (BS), comprising:

transmitting, to a user equipment (UE), first one or more messages comprising:

a request for capability information of the UE, and configuration parameters of a plurality of cells, wherein the plurality of cells are to be associated with a plurality of physical uplink control channel (PUCCH) groups comprising:

a first PUCCH group comprising an active serving cell, and a secondary PUCCH group comprising a PUCCH secondary cell to be activated, and receiving, from the UE, second one or more messages indicating the capability information of the UE, wherein the capability information is used for activating the PUCCH secondary cell for the UE.

Example 48 is the method of example 47, wherein the first one or more messages comprise UECapabilityEnquiry.

Example 49 is the method of example 48, wherein the second one or more messages comprise UECapabilityInformation.

Example 50 is an apparatus for a user equipment (UE), the apparatus comprising: one or more processors configured to perform steps of the method according to any of examples 1-26.

Example 51 is an apparatus for a base station (BS), the apparatus comprising:

one or more processors configured to perform steps of the method according to any of examples 27-49.

Example 52 is a computer readable medium having computer programs stored thereon which, when executed by one or more processors, cause an apparatus to perform steps of the method according to any of examples 149.

Example 53 is an apparatus for a communication device, comprising means for performing steps of the method according to any of examples 149.

Example 54 is a computer program product comprising computer programs which, when executed by one or more processors, cause an apparatus to perform steps of the method according to any of examples 149.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc, of one embodiment can be used in another embodiment. The parameters/attributes/aspects/etc, are merely described in one or more embodiments for clarity, and it is recognized that the parameters/attributes/aspects/etc. can be combined with or substituted for parameters/attributes/etc, of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. One or more non-transitory, computer-readable media having instructions that, when executed, cause processor circuitry to:

receive, from a base station (BS), one or more messages that include configuration parameters of a plurality of cells, wherein the plurality of cells are to be associated with a plurality of physical uplink control channel (PUCCH) groups including a first PUCCH group with an active serving cell and a secondary PUCCH group with a PUCCH secondary cell to be activated; and perform at least one operation during activation of the PUCCH secondary cell based on a user equipment (UE) capability of a UE, wherein the UE capability corresponds to support of different numerologies between a random access channel (RACH) in the secondary PUCCH group and channels in the first PUCCH group during the activation of the PUCCH secondary cell.

2. The one or more non-transitory, computer-readable media of claim 1, wherein the UE is to perform at least one operation during activation of the PUCCH secondary cell further based on timing advance group (TAG) configurations in the configuration parameters.

3. The one or more non-transitory, computer-readable media of claim 2, wherein the plurality of cells are associated with one or more TAGS based on the TAG configurations.

4. The one or more non-transitory, computer-readable media of claim 3, wherein:

each of the plurality of PUCCH groups is associated with one TAG of the one or more TAGs, and wherein the one TAG is associated with at least one of the plurality of PUCCH groups; or each of the one or more TAGs is associated with one PUCCH group of the plurality of PUCCH groups, and wherein the one PUCCH group is associated with at least one of the one or more TAGS.

5. The one or more non-transitory, computer-readable media of claim 3, wherein the plurality of PUCCH groups is associated with the one or more TAGs in one-to-one correspondence.

6. The one or more non-transitory, computer-readable media of claim 3, wherein: the plurality of PUCCH groups comprises at least one intra-band PUCCH group and at least one inter-band PUCCH group; each intra-band PUCCH group comprises intra-band aggregated cells; each inter-band PUCCH group comprises inter-band aggregated cells; and each of the at least one inter-band PUCCH group is associated with at least one of the one or more TAGs.

7. The one or more non-transitory, computer-readable media of claim 1, wherein the configuration parameters indicate that the active serving cell and the PUCCH secondary cell are intra-band aggregated.

8. The one or more non-transitory, computer-readable media of claim 7, wherein the UE capability is indicated by:

a first information element (IE) that is an extended version of diffNumerology AcrossPUCCH-Group, wherein the first IE indicates whether the UE supports different numerologies across the first and secondary PUCCH groups for data channel, control channel, and RACH; or a second IE other than diffNumerology AcrossPUCCH-Group, wherein the second IE indicates whether the UE supports different numerologies between each of the channels in the first PUCCH group and RACH in the secondary PUCCH group during the activation of the PUCCH secondary cell, wherein the channels comprise data channel, control channel and RACH.

9. The one or more non-transitory, computer-readable media of claim 1, wherein the configuration parameters indicate the active serving cell and the PUCCH secondary cell are inter-band aggregated, and the UE capability indicates that the UE supports the different numerologies between each of the channels in the first PUCCH group and RACH in the secondary PUCCH group, wherein the channels include a data channel, a control channel, and a RACH.

10. The one or more non-transitory, computer-readable media of claim 1, wherein: the UE capability indicates that the UE does not support different numerologies; the at least one operation during the activation of the PUCCH secondary cell comprises a scheduling restriction for the UE; the configuration parameters indicate that the different numerologies are configured for the active serving cell and the PUCCH secondary cell; and the UE is to perform at least one operation during activation of the PUCCH secondary cell by:

stopping uplink transmission for the active serving cell in the first PUCCH group on first symbols, wherein the first symbols are RACH occasions (ROs) symbols for the activation of PUCCH secondary cell or symbols that fully or partially overlap with the RO symbols, wherein the uplink transmission is associated with PUCCH, physical uplink shared channel (PUSCH) or sounding reference signal (SRS).

11. An apparatus comprising:

interface circuitry; and processing circuitry, coupled with the interface circuitry, the processing circuitry to:

receive, from a base station (BS) using the interface circuitry, one or more first messages that include: configuration parameters of a plurality of cells and a request for capability information of a user equipment (UE), wherein the plurality of cells are to be associated with a plurality of physical uplink control channel (PUCCH) groups that include a first PUCCH group having an active serving cell, and a secondary PUCCH group having a PUCCH secondary cell to be activated, and output for transmission to the BS using the interface circuitry, one or more second messages that indicate the capability information of the UE, wherein the capability information is to be used for at least one operation performed by the UE during activation of the PUCCH secondary cell based on a UE capability of the UE, wherein the UE capability corresponds to support of different numerologies between a random access channel (RACH) in the secondary PUCCH group and channels in the first PUCCH group during the activation of the PUCCH secondary cell.

12. The apparatus of claim 11, wherein the one or more first messages comprise a UECapabilityEnquiry.

13. The apparatus of claim 11, wherein the one or more second messages comprise UECapability Information.

14. A method comprising:

outputting, for transmission to a user equipment (UE), one or more messages that include: configuration parameters of a plurality of cells, wherein the plurality of cells are to be associated with a plurality of physical uplink control channel (PUCCH) groups that include a first PUCCH group comprising an active serving cell and a secondary PUCCH group comprising a PUCCH secondary cell to be activated; and activating the PUCCH secondary cell for the UE based on a UE capability, wherein the UE capability corresponds to support of different numerologies between a random access channel (RACH) in the secondary PUCCH group and channels in the first PUCCH group during the activation of the PUCCH secondary cell.

15. The method of claim 14, further comprising: activating the PUCCH secondary cell for the UE based on timing advance group (TAG) configurations in the configuration parameters.

16. The method of claim 14, wherein the configuration parameters indicate that the active serving cell and the PUCCH secondary cell are intra-band aggregated.

17. The method of claim 16, wherein: the UE capability is indicated by an information element (IE) other than diffNumerology AcrossPUCCH-Group; the IE indicates whether the UE supports different numerologies between each of the channels in the first PUCCH group and RACH in the secondary PUCCH group; and the channels include a data channel, a control channel, and a RACH.

18. The method of claim 14, wherein the UE capability is indicated by an information element (IE) which is an extended version of diffNumerology AcrossPUCCH-Group, the IE indicates whether the UE supports different numerologies across the first and secondary PUCCH groups for data channel, control channel and RACH.

19. The method of claim 14, wherein: the configuration parameters indicate the active serving cell and the PUCCH secondary cell are inter-band aggregated; the UE capability indicates that the UE supports the different numerologies between each of the channels in the first PUCCH group and RACH in the secondary PUCCH group; and the channels include a data channel, a control channel, and a RACH.

20. The method of claim 14, wherein the UE capability indicates that the UE does not support different numerologies, and the configuration parameters comprise a scheduling restriction for the BS.

\* \* \* \* \*